US012563051B2

(12) United States Patent
Boucadair et al.

(10) Patent No.: US 12,563,051 B2
(45) Date of Patent: Feb. 24, 2026

(54) ASSISTANCE METHOD FOR MANAGING A CYBER ATTACK, AND DEVICE AND SYSTEM THEREOF

(71) Applicant: Orange, Issy-les-Moulineaux (FR)

(72) Inventors: Mohamed Boucadair, Chatillon (FR); Christian Jacquenet, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 527 days.

(21) Appl. No.: 17/780,603

(22) PCT Filed: Nov. 26, 2020

(86) PCT No.: PCT/FR2020/052180
§ 371 (c)(1),
(2) Date: May 27, 2022

(87) PCT Pub. No.: WO2021/105617
PCT Pub. Date: Jun. 3, 2021

(65) Prior Publication Data
US 2023/0082637 A1 Mar. 16, 2023

(30) Foreign Application Priority Data
Nov. 29, 2019 (FR) ...................................... 1913504

(51) Int. Cl.
*H04L 9/40* (2022.01)
*H04L 67/52* (2022.01)
(Continued)

(52) U.S. Cl.
CPC ................................ *H04L 63/1416* (2013.01)

(58) Field of Classification Search
CPC .................................................. H04L 63/1416
See application file for complete search history.

(56) References Cited

U.S. PATENT DOCUMENTS 10,397,255 B1 * 8/2019 Bhalotra ............. H04L 63/1425
2013/0152187 A1 6/2013 Strebe et al.

FOREIGN PATENT DOCUMENTS

WO WO-2019209507 A1 * 10/2019 ............... G06F 1/04

OTHER PUBLICATIONS

English translation of the Written Opinion of the International Searching Authority dated Feb. 17, 2021 for corresponding International Application No. PCT/FR2020/052180, filed Nov. 26, 2020.
(Continued)

*Primary Examiner* — Kostas J Katsikis
(74) *Attorney, Agent, or Firm* — David D. Brush; Westman, Champlin & Koehler, P.A.

(57) ABSTRACT

Assistance method for managing a cyber attack, and device and system thereof. The assistance method is implemented by a device managing resources of a computing domain, these resources being protected by a plurality of cyber attack protection services. The method includes: determining an incapability of a first protection service from among the plurality of protection services to handle a cyber attack targeting at least one resource of the computing domain; developing a mitigation plan for mitigating the attack based on a mitigation plan obtained from a second protection service from among the plurality of protection services or using assistance provided by at least the second protection service; and transmitting the developed mitigation plan to the first protection service to handle the attack.

16 Claims, 3 Drawing Sheets

(51) Int. Cl.
| | |
|---|---|
| *H04L 67/562* | (2022.01) |
| *H04W 12/06* | (2021.01) |
| *H04W 12/63* | (2021.01) |

(56) References Cited

OTHER PUBLICATIONS

International Search Report dated Feb. 9, 2021 for corresponding International Application No. PCT/FR2020/052180, Nov. 26, 2020.

Written Opinion of the International Searching Authority dated Feb. 9, 2021 for corresponding International Application No. PCT/FR2020/052180, filed Nov. 26, 2020.

M. Boucadair et al., "Distributed Denial-of-Service Open Threat Signaling (DOTS) Data Channel Specification; draft-etf-dots-data-channel-31", Internet Draft, Jul. 22, 2019.

T. Reddy et al., "Distributed Denial-of-Service Open Threat Signaling (DOTS) Signal Channel Specification; draft-ietf-dots-signal-channel-39", Internet Draft, Nov. 20, 2019.

Dobbins R. et al., "Use cases for DDOS Open Threat Signaling; draft-ietf-dots-use-cases-20.txt", No. 20, 05 Sep. 2019, p. 1-15, Use Cases for Ddos Open Threat Signaling; DRAFT-IETF-DOTS-USE-CASES-20.TXT; Internet-Draft: Dots, Internet Engineering Task Force, IETF; Standardworkingdraft, Internet Society (ISOC) 4, RUE DES Falais, Retrieved from the Internet: URL:https://tools.ietf.org/html/draft-ietf-dots-use-cases-20 , XP015134982.

Boucadair M. et al., "Distributed-Denial-of-Service Open Threat Signaling (DOTS) Agent Discovery; draft-ietf-dots-server-discovery-06.txt", No. 6, Nov. 18, 2019, p. 1-23, Distributed-Denial-Of-Service Open Threat Signaling (Dots) Agent Discovery; DRAFT-IETF-DOTS-Server-Discovery-06.TXT; Internet-Draft: Dots, Internet Engineering Task Force, IETF; Standardworkingdraft, Retrieved from the Internet: URL:https://tools.ietf.org/html/draft-ietf-dots-server-discovery-06, XP015136518.

Mortensen A. et al., "Distributed Denial of Service (DDoS) Open Threat Signaling Requirements; draft-IETF-dots-requirements-22.txt", No. 22, Mar. 23, 2019, p. 1-22, Distributed Denial of Service (DDOS) Open Threat Signaling Requirements; DRAFT-IETF-DOTS-Requirement-22.TXT; Internet-Draft: DOTS, Internet Engineering Task Force, IETF; Standardworkingdraft, Interne, Retrieved from the Internet: URL:https://tools.ietf.org/html/draft-ietf-dots-requirements-22 , XP015132117.

* cited by examiner

[Fig. 1]
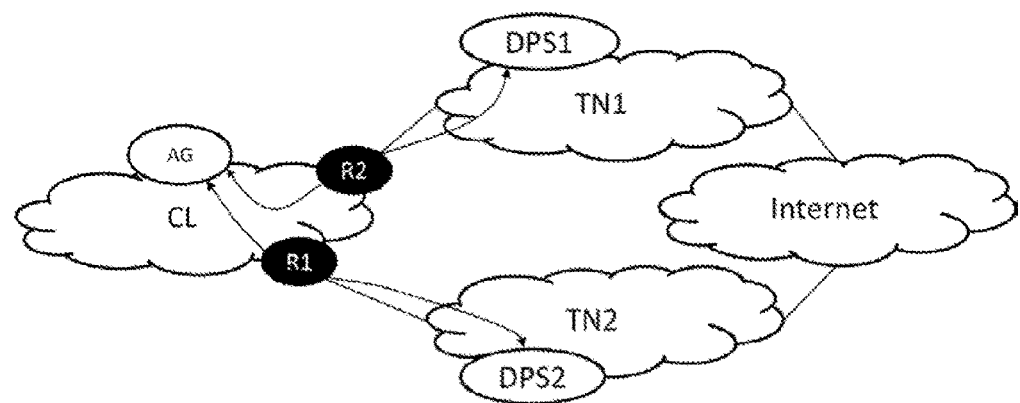
[Fig. 2]
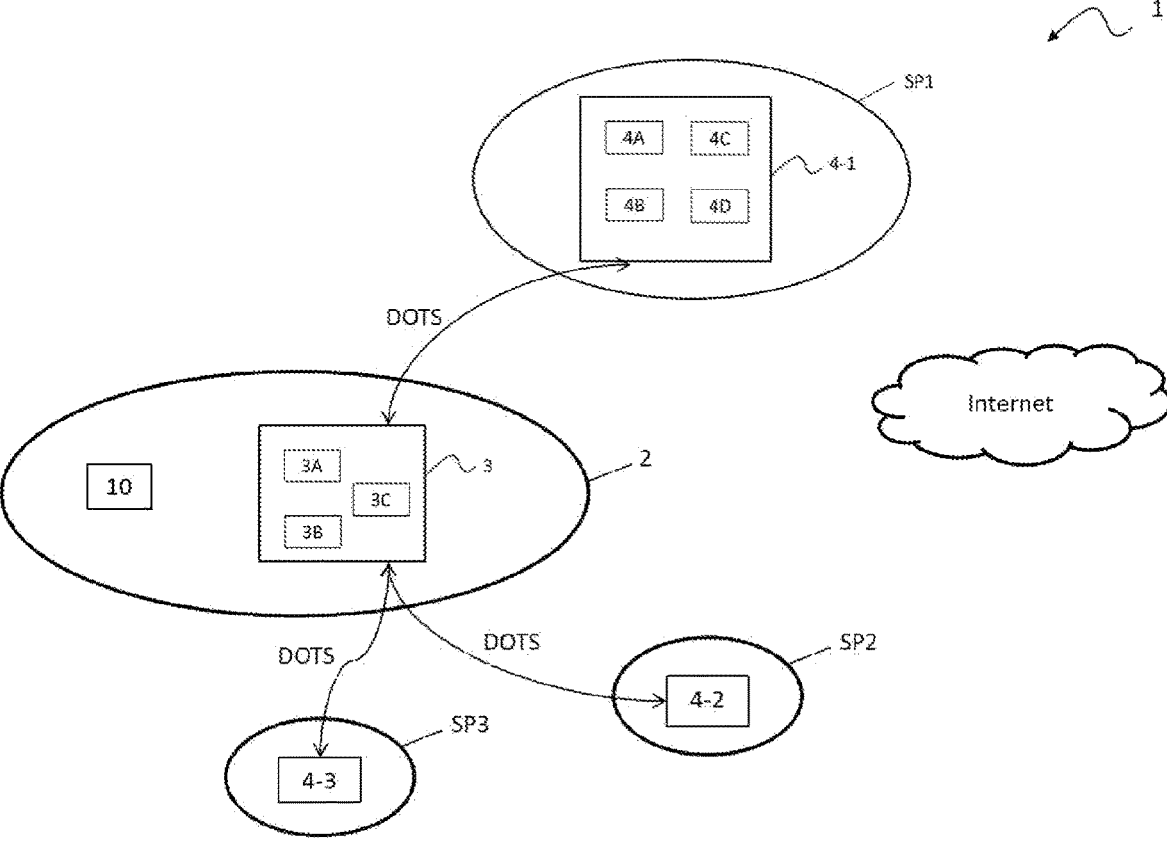
[Fig. 3]
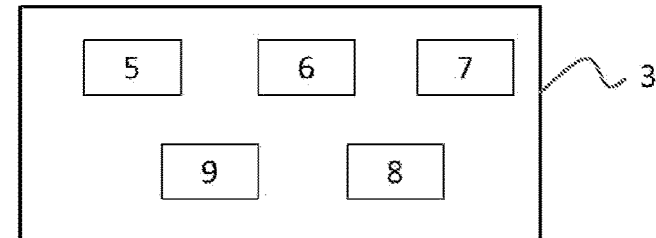

[Fig. 4]
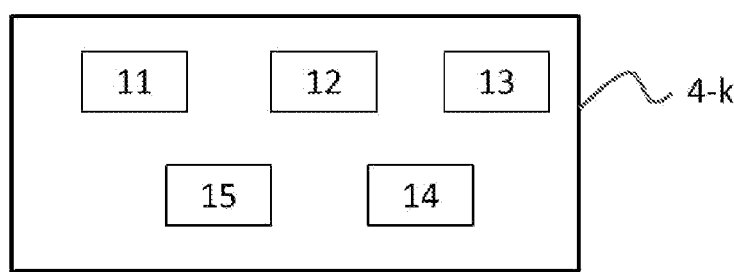
[Fig. 5]
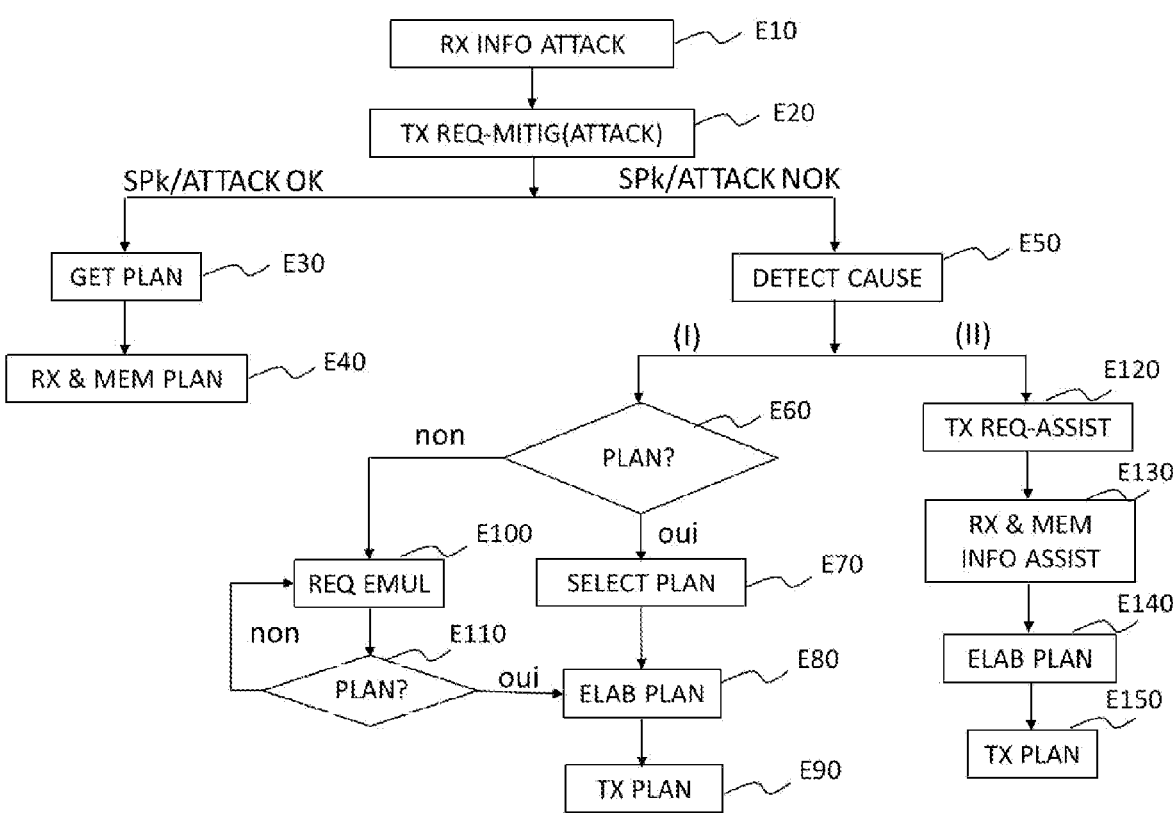

[Fig. 6]
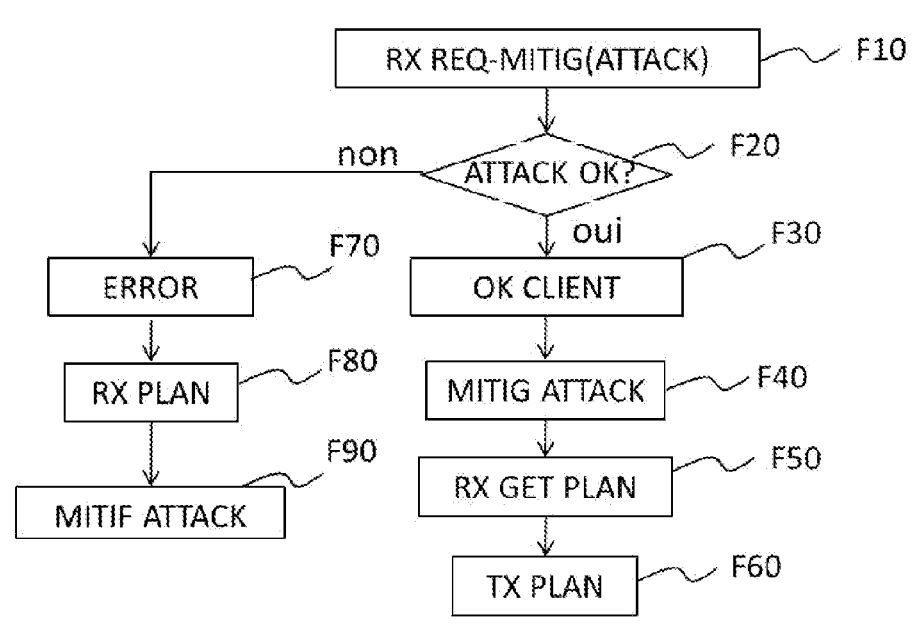
[Fig. 7]
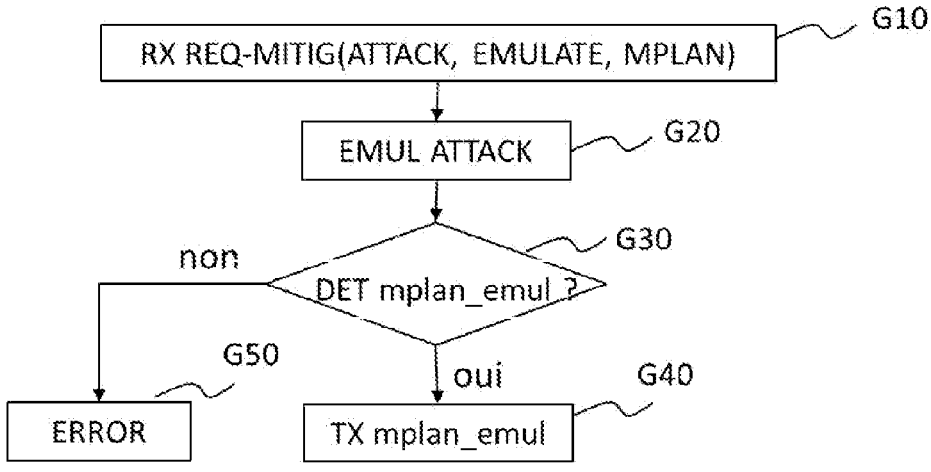

ASSISTANCE METHOD FOR MANAGING A CYBER ATTACK, AND DEVICE AND SYSTEM THEREOF

CROSS-REFERENCE TO RELATED APPLICATIONS

This Application is a Section 371 National Stage Application of International Application No. PCT/FR2020/ 052180, filed Nov. 26, 2020, which is incorporated by reference in its entirety and published as WO 2021/105617 A1 on Jun. 3, 2021, not in English.

FIELD OF THE DISCLOSURE

The invention pertains to the general field of telecommunications.

It relates more particularly to the resolution of cyber attacks liable to affect the resources of a computing domain benefiting from connectivity to the public Internet network.

The invention applies in particular to denial of service (DoS) or DDoS (Distributed DoS) cyber attacks. A DoS attack is an attempt to make resources of a computing domain, such as for example network or computing resources, unavailable to their users.

BACKGROUND OF THE DISCLOSURE

DDoS attacks are often massive and likely to compromise several hundred thousand user equipments (fixed or mobile terminals, connected objects, servers, network resources, etc.), which may in turn be used as relays to amplify the harmful power of these attacks. By way of indication, the company Symantec, in its 2019 annual report, documents nearly 24,000 applications embedded in mobile terminals blocked every day by such attacks, an increase of 600% between 2016 and 2017 in attacks targeting connected objects, and an increase in the volume of attack traffic between 2016 and 2017 that represented 5% of global web traffic in 2016 compared to 7.8% in 2017.

DDoS attacks are becoming increasingly frequent and intense, and may target several hundred thousand computing machines. To protect their computing resources against such attacks, many companies subscribe to DPS (for "DDoS Protection Services") protection services. However, when so many machines are involved in carrying out the attacks, implementing appropriate filtering policies, that is to say filtering policies capable of isolating the traffic coming from all affected machines, is all the more complicated since these machines may be distributed over multiple distinct networks. These networks are themselves able to be protected by distinct DPS offerings offered and managed by distinct (independent) administrative entities.

FIG. 1 shows, by way of illustration, a client computing domain CL connected to two transit networks TN1 and TN2 providing it with access to the Internet. Each of the transit networks hosts a dedicated DPS protection service, referenced DPS1 for the transit network TN1 and DPS2 for the transit network TN2. It is assumed, in the example contemplated in FIG. 1, that the client domain CL uses what are called PI (for "Provider-Independent") addresses for its interconnection links with the transit networks TN1 and TN2: one and the same addressing plan is thus used by the client domain CL on all of its interconnection links with the transit networks TN1 and TN2, independently of the addressing plan used by these transit networks.

It should also be noted that an increasing number of DPS protection offerings are based on services hosted in the "cloud", and not only within infrastructures operated by Internet access providers. These deployments in the cloud pose technical problems, particularly with regard to the early detection of attacks, because the components of the DPS service that are involved in the detection or the resolution of attacks and hosted in the cloud are not necessarily present on the various paths taken by the attack traffic, meaning that they are not able to inspect and filter this traffic.

The above considerations are of course not limited to DDoS attacks, and remain applicable to other types of attack, such as identity spoofing attacks (for example for data theft purposes), ransomware, etc.

Cyber attacks experienced by computing systems nowadays are therefore wide-ranging, both in terms of their nature and in terms of their size (volume of traffic in the attack, amplitude of the attack, etc.) and their scope for harm (a single machine targeted, or multiple machines by targeting the local area network of a company, the network of an operator, etc.). The targets of these attacks or the relays used to propagate them are also extremely varied: fixed or mobile terminals, connected objects, servers, network resources, etc.

As a result, some cyber attack protection services (DPS services or others depending on the attacks experienced) may encounter difficulties in handling and mitigating these attacks.

Some protection services may thus have a limited handling and mitigation capacity and may not be able to handle large-scale attacks or attacks corresponding to a volume of infected traffic that exceeds a certain threshold. Indeed, in addition to its mitigation function, a cyber attack protection service has to coordinate operations of routing traffic to the client computing domain that it protects, so that legitimate traffic destined therefor is routed thereto in a normal manner. To achieve this, the protection service has to identify suspicious traffic and then isolate it so that it is not routed to the client computing domain. To this end, it may use what is called a "scrubbing" center or function, which may prove to be undersized to handle attacks invoking significant CPU (Central Processing Unit) resources or capacities. The effectiveness of the mitigation implemented by the protection service is then reduced and the client computing domain continues to experience the attack despite the intervention of the protection service.

Other protection services may have a functional deficiency in terms of detecting and mitigating new attacks and fail to implement an effective mitigation plan against such attacks, because they do not have any mechanisms for detecting and identifying the traffic characteristic of these attacks, for example. Indeed, the most recent attacks are becoming increasingly complex to characterize because they may involve millions of sources, adopt a dynamic attack strategy such as utilizing multiple protocols, etc.

These capacity or functional deficiencies of the protection services may have a non-negligible impact on mitigating (including the period required to implement the mitigation actions) an attack targeting the resources of a client computing domain. The example of FIG. 1 will be considered by way of illustration.

Upon detection of an attack within the client computing domain CL and affecting in particular all of the interconnection links connecting the client domain CL to the transit networks TN1 and TN2 (it should be noted that these links are involved in the routing of the attack traffic, but they are not necessarily the target of the attack), an agent AG of the client computing domain CL calls upon the two protection services DPS1 and DPS2 to mitigate the attack.

It is assumed here that the service DPS1 quickly implements an effective mitigation plan since it has detection and mitigation mechanisms suited to the type of attack in progress, while the service DPS2 fails to implement an effective mitigation plan, for example because it does not have any mechanism for detecting and identifying the traffic characteristic of this attack. The attack traffic is then blocked by the transit network TN1, but continues to be routed to the client domain CL via the transit network TN2. The client domain CL thus still falls victim to the attack despite the mitigation plan implemented by the system DPS1.

It should be noted that a similar attack may be implemented if the client domain CL uses what are called PA (Provider-Aggregatable) addresses, that is to say if the addresses used on the interconnection links that connect the client domain CL to the transit networks TN1 and TN2 are those provided by each of the connectivity providers that operate these transit networks TN1 and TN2.

SUMMARY OF THE INVENTION

The invention makes it possible in particular to rectify the drawbacks of the prior art by proposing an assistance method implemented by a device managing resources of a computing domain, said resources being protected by a plurality of cyber attack protection services, this method comprising:

a step of determining an incapability of a first protection service from among said plurality of protection services to handle a cyber attack targeting at least one resource of the computing domain;

a step of developing a mitigation plan for mitigating the attack based on a mitigation plan obtained from a second protection service of the plurality of protection services or using assistance provided by at least the second protection service; and a step of transmitting the mitigation plan thus developed to the first protection service to handle the attack.

In correlation, the invention also targets a device managing resources of a computing domain, configured so as to communicate with a plurality of cyber attack protection services protecting said resources of the computing domain, this device comprising:

a determination module, configured so as to determine an incapability of a first protection service of the plurality of protection services to handle a cyber attack targeting at least one resource of the computing domain;

a development module, configured so as to develop a mitigation plan for mitigating said attack based on a mitigation plan obtained from a second protection service of the plurality of protection services or using assistance provided by at least the second protection service; and a transmission module, configured so as to transmit the mitigation plan thus developed to the first protection service to handle the attack.

The invention thus proposes to utilize the subscription, by the computing domain, to a plurality of protection services (all or some of which may in particular be managed by distinct administrative entities) to dynamically provide assistance to a protection service that is incapable of managing a cyber attack detected in the computing domain (first protection service within the meaning of the invention, also referred to hereinafter as "incapable protection service"). This assistance takes the form of a mitigation plan that is developed and provided to the incapable protection service, based on a mitigation plan implemented or determined by another protection service (second protection service within the meaning of the invention) in response to the attack, thus making it possible to rectify a functional deficiency of the incapable protection service, or using the assistance of another protection service (second protection service within the meaning of the invention), thus making it possible to rectify a lack of capacity of the incapable protection service.

Hereinafter, "mitigation plan" denotes a set of actions developed for the resolution of an attack. These actions are intended to prevent the attack traffic from propagating in the computing domain. These may involve actual mitigation actions implemented or developed by a protection service, but also include assistance provided by a protection service in order to expand the capacities of the incapable protection service and enable it to resolve the attack, etc.

There is no limit attached to the nature of the resources that may be targeted by an attack; they may be for example an IP address, an IP prefix, a machine, an alias, a fully qualified domain name (FQDN), etc.

The invention is thus not limited to a local application of the mitigation plan developed within the computing domain, an application that is not always possible depending on the state of the resources affected by the attack; but it also makes provision to transmit the developed mitigation plan to the incapable protection service in order to overcome its deficiencies. This makes it possible, when the protection service protects resources such as interconnection links interconnecting the computing domain with the Internet or transit networks, to block attack traffic in advance, upstream and/or at the entrance of the client computing domain.

It should be noted that the invention is not restricted to a first protection service protecting resources of the computing domain targeted by the attack. It may also apply to a first protection service protecting resources of the computing domain that are involved in routing the attack traffic to the resources targeted by said attack. Consideration is thus given here to an attack falling within the scope of action of the first protection service.

These considerations also apply to the second protection service. It should however be noted that, in some embodiments described in more detail later on, the attack may not fall within the scope of action of the second protection service.

Advantageously, according to the invention, the mitigation plan transmitted to the incapable protection service is developed by a device managing the resources of the computing domain that are protected by the plurality of protection services, also sometimes referred to here as "client domain" or else "client computing domain". Since the protection services may be managed by distinct administrative entities, they do not necessarily know about the mitigation actions implemented by the other protection services protecting resources of the client domain. By contrast, the client domain has global visibility of the actions implemented to protect its resources, and the invention advantageously utilizes this visibility to coordinate and improve the effectiveness of the mitigation efforts undertaken by the protection services in the presence of an attack detected in the client domain. This management by the client domain results in a better reaction time and attack handling along with an increased speed of carrying out the mitigation actions. This thus guarantees continuity of the services offered by the computing domain.

By way of illustration, in the example described above with reference to FIG. 1, in the event of a functional deficiency of the protection service DPS1, the invention makes it possible to utilize the knowledge of the attack by the protection service DPS2 and an effective mitigation plan thereof by developing and providing, to the protection service DPS1, a mitigation plan developed based on the mitigation plan implemented by the protection service DPS2. It is thus possible to effectively block the attack targeting the computing domain since the protection services DPS1 and DPS2 protecting the interconnection links of the client domain CL affected by the attack are therefore able to implement policies for filtering the attack traffic entering the client domain CL.

By virtue of the invention, the management of the attack affecting the computing domain is therefore improved, not only individually at the level of each protection service, but also at the level of the overall action taken by all of the protection services. It should be noted that this improvement is advantageously obtained without having to modify or extend the visibility of the traffic available to each of the protection services. Specifically, the various protection services continue to have only partial visibility of the traffic associated with the client domain, and not the overall traffic of said client domain.

The invention thus allows fast, automatic and reliable resolution of cyber attacks liable to affect the resources of a computing domain. By virtue of utilizing the mitigation actions implemented by various protection services, the invention offers the possibility of handling attacks affecting all of the resources of the computing domain.

It should be noted that there is no limit attached to the nature of the cyber attacks in question (denial of service, identity spoofing, ransomware, etc.), nor to the nature of the impacted computing resources of the domain (computing resources, network resources, interconnection links with other networks, etc.).

In one particular embodiment:

the second protection service has implemented a mitigation plan in response to the attack;

said incapability of the first protection service stems from a lack of knowledge of the attack by the first protection service; and the mitigation plan transmitted to the first protection service is developed by adapting the mitigation plan implemented by the second protection service to the resources of the computing domain that are protected by the first protection service.

This embodiment makes it possible more particularly to manage a functional incapability of the first protection service, while the second protection service is able to handle this attack and has implemented an effective mitigation plan for this purpose. The mitigation plan provided to the first protection service is then derived from the mitigation plan implemented by the second protection service. It should be noted that the derived mitigation plan is not necessarily an identical copy of the mitigation plan provided by a first protection service. It may take inspiration therefrom and/or adopt and/or adapt all or some of the actions indicated therein, so as to take into account for example constraints that are specific to the first protection service.

In another embodiment, when the attack falls within the scope of action of the first protection service only and the incapability of the first protection service stems from a lack of knowledge of the attack by the first protection service, the method furthermore comprises:

a step of sending, to the second protection service, a request to emulate the attack on at least one resource of the computing domain protected by the second protection service; and a step of obtaining a mitigation plan proposed during the emulation of the attack by the second protection service to handle this attack;

the mitigation plan transmitted to the first device being developed based on the mitigation plan obtained in the obtainment step by adapting it to the resources of the computing domain that are protected by the first protection service.

This embodiment also aims to overcome a functional deficiency of the first protection service. However, it targets a context in which the attack falls solely within the scope of action of the first protection service (in other words, the attack targets resources of the computing domain that are protected by the first protection service or the latter protects resources of the computing domain that are involved in routing the attack traffic to the resources targeted by said attack). Since the second protection service was not concerned directly by the attack affecting the computing domain, it did not implement any actual mitigation action against this attack. This does not however prevent it from being able to handle this attack (in other words to identify the attack traffic and to know how to filter it effectively), and it is this ability that the invention utilizes in this embodiment, by ordering the second protection service to emulate the attack on the resources of the computing domain that it protects and to propose a mitigation plan in response to this attack.

It should be noted that the mitigation plan proposed by the second protection service then corresponds to the resources of the computing domain that are protected by the second protection service (typically identified by dedicated IP addresses or prefixes), and not to the resources protected by the first protection service that are targeted by the attack. The development of a mitigation plan intended for the first protection service then consists in particular in the device managing the resources of the computing domain adapting the mitigation plan proposed by the second protection service to the resources protected by the first protection service.

In another embodiment, the incapability of the first protection service stems from a lack of resources available at the level of the first protection system to mitigate the attack, the method comprising a step of obtaining, from the second protection service, at least one item of information for establishing communication between the first protection system and the second protection system in order to assist it in mitigating the attack, the mitigation plan transmitted to the first protection system comprising said at least one obtained item of information.

The assistance provided by the second protection service is then, in this embodiment, capacity assistance to handle the attack, making it possible to overcome a lack of resources of the first protection service to resolve the attack, for example due to the amplitude of the attack. This embodiment makes it possible to artificially extend the resources of the first protection service to effectively resolve the attack. By virtue of the communication established between the first and the second protection service, the first protection service may for example redirect some of the traffic destined for the computing domain to the second protection service so that the latter filters it.

Of course, it may be contemplated to establish secure communication between the two protection services, for example by way of a secure tunnel.

It should furthermore be noted that the capacity assistance provided to the first protection service may stem from multiple protection services from among the plurality of protection services protecting the resources of the computing domain.

In one particular embodiment, the method comprises:

a step of interrogating all or some of the plurality of protection services protecting resources of the computing domain in order to determine the protection services able to provide assistance in mitigating a cyber attack to at least one other protection service of the plurality of protection services; and a step of storing, for each protection service declaring itself able, at least one item of information provided by this protection service allowing this assistance to be implemented.

The interrogation may take place for example upstream of the detection of an attack. This embodiment makes it possible to anticipate the problems linked to a capacity deficiency of one of the protection services. Based on the stored information, when it is informed of such a deficiency, the device managing the resources of the client computing domain may act more quickly to implement assistance with the deficient protection service.

As a variant, the interrogation step may be implemented following the detection of an attack targeting at least one resource of the computing domain.

This embodiment makes it possible to obtain up-to-date information representative of a current state of the protection services able to provide their assistance.

The information provided by the protection services able to provide assistance may be of various kinds.

Said information comprises for example at least one element from among:

a capacity available in said protection service able to provide assistance and used by said assistance, so as to facilitate the selection of an appropriate protection service to provide assistance to a deficient protection service;

information allowing the establishment of communication with said protection service able to provide assistance;

at least one security key intended to be used in said assistance with the protection service able to provide assistance, or any other element for securing the communication between the protection service able to provide assistance and the defective protection service;

a lifespan of the assistance provided by said protection service able to provide assistance. In this way, when this lifespan has expired, the device of the client computing domain turns to another protection service and the protection service that is no longer able to provide such assistance is not called upon unnecessarily.

This list is of course not exhaustive.

In one particular embodiment, in the interrogation step, the device indicates, to the interrogated protection services, a minimum capacity that a protection service that declares itself able to provide the assistance must have.

To evaluate this minimum capacity, the device may use traffic forecast mechanisms that are known per se. This minimum capacity may then be re-evaluated on a case-by-case basis according to the needs of a deficient protection service.

This embodiment makes it possible to avoid the device of the client computing domain selecting a protection service that does not have sufficient capability resources to provide assistance to a deficient protection service, and therefore wasting time in the execution of the method according to the invention.

In one particular embodiment, the method comprises, after detection of the attack, a step of sending, to all or some of the protection services of the plurality of protection services having a scope of action containing at least one resource of the computing domain targeted by the attack, a request to obtain a mitigation plan implemented by these protection services in response to the attack.

In other words, in this embodiment, the protection services provide their mitigation plans implemented where applicable against the detected attack, in response to a request from the device of the client computing domain.

As a variant, it is possible to contemplate implementing a mechanism for the spontaneous advertising, by the protection services, of the mitigation plans currently being executed. The device managing the resources of the computing domain may for this purpose for example register with each protection service in order to be informed thereby of the mitigation plans that it implements.

In one particular embodiment, when the attack targets resources protected by multiple protection services of the plurality of protection services, the method comprises:

a step of checking the compatibility of the mitigation plans implemented in response to said attack by said multiple protection services; and if at least one incompatibility is detected between mitigation plans in the checking step, a step of coordinating an adjustment of all or some of the incompatible mitigation plans so as to eliminate said at least one incompatibility.

The device managing the resources of the client computing domain thus coordinates the mitigation actions implemented by the various protection services concerned by the attack (in other words, within the scope of action within which the attack falls) so as to avoid inconsistencies between these actions.

Indeed, as mentioned above, since the protection services are liable to be managed by distinct administrative entities, they have no mutual visibility of the actions implemented by the other protection services in the presence of an attack, unlike the client computing domain. One (or more) protection service(s) may thus make mitigation decisions that may have negative implications for the service provided to the client computing domain, in particular because they are not consistent with other decisions made by another protection service in response to the attack. For example, decisions made by two (or more) different protection services may lead to the establishment of a routing loop that prevents legitimate traffic from being routed to the client computing domain.

In light of the above, it appears that the invention is based on the device managing the resources of the computing domain that are protected by various cyber attack protection services, but also on the action thereof.

Thus, according to another aspect, the invention also targets a method for obtaining, by way of a first protection service of a plurality of cyber attack protection services protecting resources of a computing domain, a mitigation plan for mitigating a cyber attack targeting at least one of the resources of the computing domain, this method comprising, following detection of an incapability of the first protection service to handle the attack:

a step of receiving a mitigation plan developed by the device based on a mitigation plan obtained from a second protection service of said plurality of protection services or using assistance provided by at least the second protection service; and a step of implementing, in response to the attack, an attack mitigation plan derived from the mitigation plan received from the device to handle the attack.

In correlation, the invention also relates to a device of a first protection service of a plurality of cyber attack protection services protecting resources of a computing domain, at least one of the resources of the computing domain being targeted by a cyber attack, said device comprising modules activated following detection of an incapability of the device to handle the attack, these modules comprising:

a reception module, configured so as to receive a mitigation plan developed by a device managing said resources of the computing domain based on a mitigation plan obtained from a second protection service of said plurality of protection services or using assistance provided by at least said second protection service; and an implementation module, configured so as to implement, in response to said attack, a mitigation plan derived from the mitigation plan received from the device in order to handle the attack.

The obtainment method and the device of the first protection service benefit from the same advantages mentioned above as the assistance method and the device of the computing domain.

In one particular embodiment, the step of implementing the mitigation plan comprises, when the mitigation plan uses assistance provided by at least the second protection service, routing of data suspected of being associated with the attack to the second protection service in order to process these data.

The data are for example routed to the second protection service via a secure tunnel established with the second protection service by way of information contained in the mitigation plan received from the device.

The assistance provided by the second protection service (and possibly other protection services) allows the first protection service to offload some of the suspicious traffic that it is not able to handle and to route it to the second protection service so that it applies an appropriate mitigation plan to this suspicious traffic.

In one particular embodiment of the invention, the assistance method and/or the obtainment method are implemented by a computer.

In one particular embodiment of the invention, the assistance method and/or the obtainment method are implemented by a computer that is not directly connected to the computing domain (for example a smartphone) but able to manage the resources of said computing domain.

The invention also targets a first computer program on a recording medium, this program being able to be implemented in a computer or more generally in a device managing the resources of a client computing domain in accordance with the invention and comprising instructions designed to implement an assistance method as described above.

The invention also targets a second computer program on a recording medium, this program being able to be implemented in a computer or more generally in a device of a first cyber attack protection service in accordance with the invention and comprising instructions designed to implement an obtainment method as described above.

Each of these programs may use any programming language, and be in the form of source code, object code, or of intermediate code between source code and object code, such as in a partially compiled form, or in any other desirable form.

The invention also targets an information medium or a recording medium able to be read by a computer, and comprising instructions of the first, the second or the third computer program mentioned above.

The information or recording media may be any entity or device capable of storing the programs. For example, the media may include a storage means, such as a ROM, for example a CD-ROM or a microelectronic circuit ROM, or else a magnetic recording means, for example a hard disk, or a flash memory.

Moreover, the information or recording media may be transmissible media such as an electrical or optical signal, which may be routed via an electrical or optical cable, by radio link, by wireless optical link or by other means.

The programs according to the invention may in particular be downloaded from an Internet network.

As an alternative, each information or recording medium may be an integrated circuit in which a program is incorporated, the circuit being designed to execute or to be used in the execution of the communication method, in accordance with the invention, or of the selection method, in accordance with the invention.

The invention also targets a protection system for protecting a computing domain comprising:

a plurality of cyber attack protection services protecting resources of the computing domain;

a device managing said resources of the computing domain in accordance with the invention and configured so as to communicate with said protection services;

said plurality of protection services comprising at least:

a first protection service comprising a device according to the invention incapable of handling a cyber attack targeting at least one resource of the computing domain; and a second protection service that has implemented a mitigation plan for mitigating said attack or is able to provide assistance to the first protection service in handling said attack, which said device managing said resources of the computing domain uses to develop and transmit, to said first protection service, an attack mitigation plan.

In one particular embodiment, the second protection service comprises:

an emulation module, activated upon the request of the device of the computing domain when the attack falls within the scope of action of the first protection service only, said emulation module being configured so as to emulate said attack on at least one resource of the computing domain protected by the second protection service; and a transmission module, configured so as to transmit, to the device of the computing domain, an attack mitigation plan proposed by the second protection service during the emulation of said attack by the emulation module.

In one particular embodiment, the second protection service comprises a provision module, activated upon the request of the device managing the resources of the computing domain when said attack falls within the scope of action of the second protection service, said provision module being configured so as to provide, to the device managing the resources of the computing domain, a mitigation plan implemented by the second protection service in response to the attack.

The system according to the invention benefits from the same advantages mentioned above for the assistance method, the obtainment method, the device of the computing domain and the device of the first protection service according to the invention.

It is also possible to contemplate, in other embodiments, the assistance method, the obtainment method, the device managing the resources of the computing domain, the device of the first protection service and the system according to the invention having all or some of the abovementioned features in combination.

BRIEF DESCRIPTION OF THE DRAWINGS

Other features and advantages of the present invention will emerge from the description given below, with reference to the appended drawings that illustrate one exemplary embodiment thereof that is in no way limiting. In the figures:

FIG. 1, already described, shows a computing domain protected by two cyber attack protection services, according to the prior art;

FIG. 2 shows a protection system for protecting a computing domain in accordance with the invention in one particular embodiment;

FIG. 3 shows the hardware architecture of a device managing the resources of the computing domain that are protected by the protection system of FIG. 2, in one particular embodiment;

FIG. 4 shows the hardware architecture of a server device of a protection service of the protection system of FIG. 2, in one particular embodiment;

FIG. 5 shows the main steps of an assistance method according to the invention as they are implemented, in one particular embodiment, by the device of FIG. 3;

FIG. 6 shows the main steps of an obtainment method according to the invention as they are implemented, in one particular embodiment, by a server device of the protection system of FIG. 2; and FIG. 7 shows steps that may be implemented, in one particular embodiment, by a server device of the protection system of FIG. 2.

DETAILED DESCRIPTION OF ILLUSTRATIVE EMBODIMENTS

FIG. 2 shows a protection system 1 for protecting a computing domain 2 against cyber attacks, in accordance with the invention, in one particular embodiment.

A computing domain, also referred to as client computing domain or client domain, is understood here to mean a set of computing resources (including in particular network resources such as routers, switches, servers, terminals, etc.), placed under the responsibility of a given administrative entity. Such a computing domain is for example a company network, a home network or an autonomous system (or AS for short) using the BGP (for "Border Gateway Protocol") protocol. However, there is no limit attached to the nature of the domain nor to the type of protocols used within the computing domain 2.

The computing domain 2 is connected to the public Internet network, directly or via one or more transit networks. It possesses various computing resources (CPU resources, memory resources, network resources, interconnection links with other networks, etc.) that are protected by a plurality of cyber attack protection services SP1, SP2, . . . , SPN to which the administrator or owner of the computing domain 2 has subscribed, N denoting an integer greater than 1. For the sake of simplification, FIG. 2 shows three protection services SP1, SP2 and SP3, but the number N may be any integer greater than 1.

All or some of the protection services SP1, SP2, . . . , SPN protecting the resources of the computing domain 2, and in particular in the example contemplated here SP1, SP2 and SP3, are managed by distinct administrative entities (for example by network operators). In other words, each of these administrative entities has no visibility of the attack mitigation actions implemented by the other administrative entities and their own protection services (that is to say no knowledge a priori of these mitigation actions). In the remainder of the description, a "mitigation plan" is understood to mean actions proposed or implemented by a protection service to resolve an attack, in particular with a view to preventing the attack traffic from propagating so as to reach one or more targets in the computing domain 2.

There is no limit attached to the location of these protection services SP1, SP2, . . . , SPN. They may be hosted on one or more devices (for example on one or more servers) located in a cloud computing system (more commonly referred to as "cloud"), on the Internet, or in transit networks providing the client computing domain 2 with access to the Internet, etc. Protection services SPk, k=1 . . . N are thus understood here to mean both the service itself provided to the computing domain 2 and the one or more devices hosting the logic of this service. Therefore, no assumption is made with regard to the functional and organic structure of a DPS service.

Consideration is given here, by way of illustration, to the example of distributed denial of service (or DDoS) attacks, and it is assumed that the computing domain 2 comprises one (or more) DDoS attack detection functions. However, the invention applies to any type of cyber attack (denial of service, identity spoofing, ransomware, etc.). Furthermore, there is no limit attached to the nature of the resources that may be targeted by an attack; they may be for example an IP address, an IP prefix, a machine, an alias, a fully qualified domain name (FQDN), etc.

In the embodiment described here, the protection system 1 is based on a DOTS (for "DDoS Open Threat Signaling") client/server architecture as defined by the IETF (Internet Engineering Task Force). As is known, the DOTS architecture specified by the IETF aims to provide a signaling mechanism for detecting suspicious traffic or even a proven attack, such that appropriate mitigation measures are able to be implemented as quickly as possible. More particularly, it allows a client, called DOTS client, who manages a computing domain to inform a server, called DOTS server, of the detection of suspicious traffic potentially characteristic of a DDoS attack in progress and that appropriate mitigation actions are required. The DOTS server may then implement or coordinate various actions so that, for example, the traffic associated with the denial of service attack is no longer routed to the computing domain of the DOTS client, and that only approved (that is to say legitimate) traffic is routed to said computing domain. It should be noted that the DOTS client is not necessarily a network element of the computing domain in question, but may be connected indirectly thereto; it may be for example a control network or a terminal (for example a smartphone) of an administrator of the computing domain, etc.

For this purpose, two DOTS communication channels are defined between the DOTS client and the DOTS server:

a DOTS signal channel: this channel is only used for the duration of DDoS attacks. The DOTS client may thus use this channel to ask for help from the DOTS server by informing it that an attack is in progress. Table 1 illustrates one example of a mitigation request that may be sent via a DOTS signal channel "draft-ietf-dots-signal-channel" (corresponding to a target of the attack identified by the "ietfdots-signal-channel:mitigation-scope" attribute in table 1), by a DOTS client identified by a unique identifier CUID (for "Client Unique Identifier") "mydotsclient", to its DOTS server, to inform it that the prefix "1.2.3.0/24" (identified in the "target-prefix" field) is experiencing a DDoS attack. Upon receipt of such a mitigation request (able to be recognized by the nature of the request (PUT) and the presence of the attributes Uri-Path ("mitigate") and ("mid")), the DOTS server, after checking that this client is authorized to request actions for "1.2.3.0/24", takes appropriate measures to stop the attack if this request does not conflict with other requests coming from other clients in the same computing domain or with a filtering rule installed by another DOTS client of the domain, and if the server is authorized to/configured so as to honor the last mitigation request received. In the event of a conflict, the server returns a "4.09 Conflict" error message to inform the client; and a DOTS data channel: this channel is used if and only if no attack is in progress. The DOTS client may for example use this channel to install filtering rules (or ACL for "Access Control List"), such as filtering traffic received from certain addresses or destined for a given machine. Table 2 provides the example of a message sent on a DOTS data channel "draft-ietf-dots-data-channel" (corresponding to a filter characterized by the "ietf-dots-data-channel:access-lists" attribute in table 2), by a DOTS client with the CUID identifier "mydotsclient", asking a DOTS server to block ("actions": {"forwarding": "drop"}) all traffic destined for the prefix "1.2.3.0/24". Upon receipt of such a request (able to be recognized by the nature of the request (POST), of the "Request-URI" ("/restconf/data/ietf-dots-data-channel:dots-data/dots-client=mydotsclient"), after checking that this DOTS client is authorized to request the installation of filtering rules for the prefix "1.2.3.0/24", the DOTS server proceeds to install filtering rules if this request does not conflict with other requests coming from other clients of the same computing domain or with an existing filtering rule. In the event of a conflict with other rules maintained by the DOTS server, the latter returns a "4.09 Conflict" error message to inform the DOTS client.

These various channels are described in more detail respectively in the documents by T. Reddy et al. entitled "Distributed Denial-of-Service Open Threat Signaling (DOTS) Signal Channel Specification", and M. Boucadair et al. entitled "Distributed Denial-of-Service Open Threat Signaling (DOTS) Data Channel Specification", published by the IETF in 2019.

TABLE [1]

```
Header: PUT (Code=0.03)
Uri-Host: www.example.com
Uri-Path: ".well-known"
Uri-Path: "dots"
Uri-Path: "v1"
Uri-Path: "mitigate"
Uri-Path: "cuid=mydotsclient"
Uri-Path: "mid=57956"
Content-Format: "application/cbor"
```

TABLE [1]-continued

```
{
  "ietf-dots-signal-channel:mitigation-scope"; {
    "scope": [
      {
        "target-prefix": [
          "1.2.3.0/24",
        ],
        "target-port-range": [
          {
            "lower-port": 80
          }
        ],
        "target-protocol": [
          6
        ]
      }
    ]
  }
}
```

TABLE [2]

```
POST    /restconf/data/ietf-dots-data-channel:dots-data\
        /dots-client=mydotsclient HTTP/1.1
Host: {host}:{port}
Content-Type: application/yang-data+json
{
  "ietf-dots-data-channel:access-lists":{
    "acl": [
      {
        "name": "my-acl",
        "type": "ipv4-acl-type".
        "aces": {
          "ace": [
            {
              "name": "my-example".
              "matches": {
                "i3": {
                  "ipv4" {
                    "destination-ipv4-network": *1.2.3.0/24*
                  }
                }
              },
              "actions": {
                "forwarding": "drop"
              }
            }
          ]
        }
      }
    ]
  }
}
```

DOTS is therefore an architecture intended to facilitate the handling of attack mitigation requests sent by a DOTS client and received by a DOTS server, such as for example a server operated by a cyber attack protection service provider.

It is assumed here that the computing domain 2 comprises a device 3, in accordance with the invention, responsible for managing and monitoring all of the computing resources of the computing domain 2, and the protection services SP1, . . . , SPN comprise devices 4-1, . . . , 4-N, respectively, also in accordance with the invention, the device 3 and the devices 4-1, . . . , 4-N being able to interact with one another according to the principles that have just been described and are characteristic of the DOTS client/server architecture. In this operating mode, the device 3 acts as a DOTS client (it is referred to hereinafter as "client device 3" for the sake of simplification) and the devices 4-1, 4-2, . . . , 4-N act as DOTS servers. The invention however applies to other architectures and/or to other protocols allowing the devices 3, 4-1, . . . , 4-N to communicate with one another.

It should be noted that, for the sake of simplification, in the example contemplated in FIG. 2, the client device 3 and the server devices 4-1, . . . , 4-N communicate directly with one another (possibly after prior authentication of the DOTS client device 3 by the DOTS server devices 4-1, . . . , 4-N). As a variant, the DOTS communications between a DOTS client and a DOTS server may take place via relays (or "DOTS gateways"). These relays may be hosted within the domain of the DOTS client (also referred to as "client domain") or within the domain of the server (also referred to as "server domain"), or in both. A DOTS relay located in a domain of the client is considered to be a DOTS client by a DOTS server. A DOTS relay located in a server domain is considered to be a DOTS server by a DOTS client.

It should also be noted that, in the event a DOTS relay being present in a server domain, the relay is responsible for authenticating the DOTS clients. A DOTS server should be configured with the list of active DOTS relays within its domain; it may then delegate some of its functions to these trusted relays. In addition, the DOTS server may securely use the information provided by a relay contained in a list declared to the DOTS server and held thereby, by way of an ad-hoc authentication procedure (for example, explicit configuration of the list of relays by the authorized administrator of the server, retrieval of the list from an AAA (for "Authentication, Authorization and Accounting") server, etc.).

In the embodiment described here, the client device 3 is configured so as to establish, with the server devices 4-1, . . . , 4-N of the protection services SP1, . . . , SPN (or DOTS relays located in the computing domains hosting the server devices 4-1, . . . , 4-N), secure DOTS sessions in accordance with the abovementioned IETF specification entitled "Distributed Denial-of-Service Open Threat Signaling (DOTS) Signal Channel Specification". In particular, the sessions are established here using the DTLS (for "Datagram Transport Layer Security") protocol, or the TLS (for "Transport Layer Security") protocol. The details of the TLS/DTLS exchanges and those regarding the management of any security keys are not reproduced here.

Furthermore, in the embodiment described here, it is assumed that the various DOTS agents (clients, servers and relays) involved (that is to say the DOTS client device 3 and the DOTS server devices 4-1, . . . , 4-N or relays between these DOTS devices) are configured so as to authenticate one another. This thus ensures that DOTS messages received from a machine spoofing a legitimate DOTS server device 4-1, . . . , 4-N are rejected by the DOTS client device 3. In the same way, requests from DOTS client devices that are not authorized to access the service offered by the DOTS server device 4-1, . . . , 4-N under consideration are ignored thereby.

In the embodiment described here, the DOTS client device 3 has the hardware architecture of a computer, as shown in FIG. 3. It comprises in particular a processor 5, a random access memory 6, a read-only memory 7, a non-volatile memory 8, and communication means 9 allowing it in particular to communicate, using in particular the DOTS protocol, with the server devices 4-1, . . . , 4-N of the protection services SP1, . . . , SPN. These communication means 9 are based on a wired or wireless communication interface, which is known per se and not described in more detail here.

The read-only memory 7 of the client device 3 constitutes a recording medium in accordance with the invention, able to be read by the processor 5 and on which there is recorded a computer program PROG3 in accordance with the invention, comprising instructions for executing the steps of an assistance method according to the invention. The program PROG3 defines functional modules of the client device 3, which are based on or control the abovementioned hardware elements 5 to 9 of the client device 3, and which comprise in particular (cf. FIG. 2):

a determination module 3A, configured so as to determine an incapability of a first protection service from among the plurality of protection services SP1, . . . , SPN to handle a cyber attack targeting at least one resource of the computing domain 2, and falling within the scope of action of the first protection service;

a development module 3B, configured so as to develop a mitigation plan for mitigating said attack based on a mitigation plan obtained from a second protection service from among the plurality of protection services SP1, . . . , SPN or using assistance provided by at least said second protection service; and a transmission module 3C, configured so as to transmit the developed mitigation plan to the first protection service to handle the attack.

It should be noted that the client device 3 may also comprise a DDoS attack detection function. In the embodiment described here, it is however assumed that this DDoS attack detection function is hosted by another device 10 of the computing domain 2 (cf. FIG. 2).

The various functions implemented by the modules 3A to 3C of the client device 3 are described in more detail later on.

Similarly, in the embodiment described here, each DOTS server device 4-1, . . . , 4-N has the hardware architecture of a computer, as shown in FIG. 4. It comprises in particular a processor 11, a random access memory 12, a read-only memory 13, a non-volatile memory 14, and communication means 15 allowing it in particular to communicate, using in particular the DOTS protocol, with the client device 3. These communication means 15 are based on a wired or wireless communication interface, which is known per se and not described in more detail here.

The read-only memory 13 of each server device 4-$k$, $k=1$ . . . N in this case constitutes a recording medium in accordance with the invention, able to be read by the processor 11 and on which there is recorded a computer program PROG4 in accordance with the invention, comprising instructions for executing the steps of an obtainment method according to the invention. The program PROG4 defines functional modules of the server device 4-$k$, which are based on or control the abovementioned hardware elements 11 to 15, and which comprise in particular (cf. FIG. 2) a reception module 4A and an implementation module 4B, which are activated following detection of an incapability of the server device 4-$k$ to handle a cyber attack targeting one or more resources of the computing domain 2.

More particularly, the reception module 4A is configured so as to receive a mitigation plan developed by the client device 3 based on a mitigation plan obtained from another protection service (second service within the meaning of the invention) SP$j$, $j=1$ . . . N and $j{\neq}k$ or using assistance provided by at least one such other protection service. The implementation module 4B is for its part configured so as to implement, in response to the cyber attack, a mitigation plan derived from the mitigation plan received from the client device 3.

In the embodiment described here, each server device 4-$k$, $k=1$ . . . N, also comprises the following functional modules (and software here):

a provision module 4C for providing, where applicable, a mitigation plan implemented by the server device 4-$k$ in response to an attack detected on the resources of the computing domain 2 falling within the scope of action of the protection service SPk;

an emulation module 4D, activated upon the request of the client device 3, and configured so as to emulate a cyber attack on at least one resource of the computing domain 2 protected by the protection service SPk, along with a transmission module 4E configured so as to transmit, to the client device 3, an attack mitigation plan proposed by the protection service SPk during the emulation of the attack by the emulation module 4D.

The various functions implemented by the modules 4A to 4E of each server device **4-*k*, k=1 . . . N are described in more detail later on. It should be noted that, for the sake of simplification, the modules 4A to 4E of the server devices 4-*k*, k=1 . . . N are shown in FIG. 2 only for the server device 4-1**.

A description will now be given, with reference to FIGS. 5 and 6, of the main steps implemented respectively by the client device 3 and by the server devices **4-*k*, k=1 . . . N to improve the management of cyber attacks targeting resources of the computing domain 2 in accordance with the invention. FIG. 5 thus illustrates the steps of an assistance method according to the invention, as implemented by the client device 3 in one particular embodiment. FIG. 6 thus illustrates the steps of an obtainment method according to the invention as implemented by a server device 4-*k0* of a protection service SPk0 from among the protection services SP1, . . . , SPN protecting the resources of the computing domain 2, along with the steps implemented by the other server devices 4-*k***, k=1 . . . N, k≠k0 in this particular embodiment.

With reference to FIG. 5, it is assumed here that a cyber attack ATTACK has been detected on at least one resource of the computing domain 2 by the cyber attack detection function 10, in a manner known per se. This attack is signaled, by the detection function 10, to the client device 3 (step E10). During this signaling, the detection function 10 provides various information about the attack ATTACK to the client device 3, such as for example the features of the attack traffic (one or more source addresses, one or more destination addresses, one or more protocol identifiers (for example ICMP (for Internet Control Message Protocol), TCP (for Transmission Control Protocol), etc.), the nature of the attack (here DDoS attack), etc). This information may be supplemented by information about the volume of the attack traffic, obtained for example by the function 10 via the collection of SNMP (for Simple Network Management Protocol) counters on the implicated interfaces.

Upon receipt of this signaling, the client device 3 sends a DOTS request to all or some of the devices 4-1, . . . , 4-N to signal the detected cyber attack ATTACK and ask them for help in resolving this attack (step E20). The DOTS request that is sent is for example a "Request Mitigation" DOTS request known from the prior art, similar or identical to the request given by way of illustration in table 1. It is sent by the client device 3 to all of the server devices 4-1, . . . , 4-N or only to the server devices from among the server devices 4-1, . . . , 4-N protecting the resources targeted by the attack or involved in routing the attack traffic to the computing domain 2. This sending may take place in parallel to each of the server devices or sequentially.

Solely by way of illustration, it is assumed here that the attack ATTACK falls within the scope of action of the protection services SP1 and SP2, and more particularly targets resources protected by the protection services SP1 and SP2, and that the DOTS request is sent by the client device 3 to the server devices 4-1 and 4-2 only.

With reference to FIG. 6, the one or more server devices contacted (step F10) by the client device 3, and which is (are) able to handle this attack (response "yes" in test step F20), acknowledge(s) the attack mitigation request received from the client device 3 by sending a "2.01 Created" DOTS message thereto (step F30). "Able to handle this attack" or "capable of handling this attack" is understood to mean here that the server device has the functional capability (that is to say it is aware of the attack, knows how to identify it and mitigate it) and has the hardware and/or software resources (in an appropriate number) to handle it and mitigate it.

Each server device of a protection service capable of handling the attack also implements a mitigation plan to handle the traffic destined for the computing domain 2 visible thereto (in other words destined for or passing through the resources of the computing domain 2 that it protects) (step F40). It informs the client device 3 that it has successfully implemented a mitigation plan against the attack.

In the illustrative example introduced above, it is assumed here that the protection service SP1 is able to handle the attack, successfully implements a mitigation plan against this attack and informs the client device 3 thereof.

If, on the other hand, one of the protection services that is contacted is not able to handle this attack (response "no" in test step F20), it informs the client device 3 thereof by sending for example an error message such as a "5.03 (Service Unavailable)" DOTS message thereto (step F70).

In the illustrative example introduced above, it is assumed here that the protection service SP2 is not able to handle the attack, and informs the client device 3 thereof.

With reference to FIG. 5, the client device 3 asks the one or more protection services that have implemented a mitigation plan against the attack ("SPk/ATTACK OK" branch) to provide it with these one or more mitigation plans (step E30). For this purpose, it sends, for example, to each server device concerned, a DOTS GET request containing an attribute ("Uri-Path"), newly introduced for the purposes of the invention and called "mplan" here. One example of such a request is provided by way of illustration in table 3 below.

TABLE 3

| |
| --- |
| Header: GET (Code=0.01) |
| Uri-Path: ".well-known" |
| Uri-Path: "dots" |
| Uri-Path: "mitigate" |
| Uri-Path: "cuid=dz6pHjaADkaFTbjr0JGBpw" |
| Uri-Path: "mid=12332" |
| Uri-Path: "mplan" |

The request may comprise an attack mitigation identifier, "mid" (for "Mitigation IDentifier"), assumed here, for the attack ATTACK, to be equal to "12332". If this identifier is not provided in the request then, in the embodiment described here, the server device has to communicate all of the mitigation plans of all of the mitigation actions currently being executed by the associated protection service.

Upon receipt of this request (step F50), the server device provides the client device 3, via its provision module 4B, with the technical features of the mitigation plan implemented against the attack ATTACK (or of all of the mitigation plans currently being executed if no attack mitigation identifier is specified in the GET request) (step F60). The mitigation plan is provided in the form of a list (which may be ordered) comprising one or more rules, each rule defining (that is to say characterizing) the traffic that it is desired to handle (for example the traffic identified as suspicious), and the one or more actions to be applied to the traffic characterized by the rule. Such actions are for example rejecting the traffic defined by the rule associated with the action, redirecting the traffic, limiting the bit rate of the traffic, etc.

One example of a response provided by the server device is illustrated in table 4.

TABLE 4

```
{
    "ietf-dots-signal-channel:mitigation-scope": {
        "scope": [
            {
                "mid": 12332,
                "mitigation-start": "1507818434",
                "lifetime": 989,
                "status": "attack-successfully-mitigated",
                "mplan": {
                ... (cf. table 5)
                }
            }
        ]
    }
}
```

According to this example, the mitigation plan is provided in the "mplan" attribute, in the body of the response. The "mplan" attribute may be structured in accordance with a formalism similar or identical to that of the ACLs (Access Control Lists) defined in the specification of the DOTS protocol, or in accordance with an ECA (Event, Condition, Action) chronology, etc. By way of illustration, one example of a mitigation plan is given below in table 5.

TABLE 5

```
"mplan": {
    "ace": [
        {
            "name": "rule1",
            "matches": {
                "ipv4": {
                    "destination-ipv4-network": "1.2.3.0/24",
                    "source-ipv4-network": "192.0.2.0/24"
                }
            },
            "actions": {
                "forwarding": "drop"
            }
        }
    ]
}
```

The plan described in table 5 contains an ACE (for "Access Control Entry"), that is to say a filtering action named "rule1": this action consists in rejecting (as indicated by the "forwarding" clause positioned at "drop" to reject without notifying the source) all of the traffic defined by the "matches" attribute, that is to say in this case the traffic sent from any address of the network associated with the prefix "192.0.2.0/24" and destined for resources associated with the prefix "1.2.3.0/24".

It should be noted that a mitigation plan may, as a variant, include multiple ACE entries; indeed, distinct actions such as redirecting, reducing bit rate, etc. may be executed by one and the same mitigation service in response to an attack.

In the remainder of the description, a mitigation plan is identified in accordance with the following formalism, when it contains one or more rules: mplan=LIST_RULES(match, action, etc.), LIST_RULES denoting a list of rules, each rule being defined by one or more conditions ("match") for identifying the traffic concerned by the rule, and one or more actions ("action") recommended by the rule for the traffic thus identified. It should be noted that, within the meaning of the invention, a mitigation plan may also or alternatively comprise one or more items of information for implementing assistance provided by a protection service for handling an attack.

The client device 3 locally stores, for example in its non-volatile memory 8, all of the mitigation plans received from the protection services with the ability to handle the attack ATTACK in association with the server devices and/or the protection services that provided these plans thereto (step E40). In the remainder of the description, mplan(SPk,mid #j) denotes the mitigation plan implemented by the protection service SPk (and its server device 4-$k$) in response to the attack identified by the attack mitigation identifier mid #j, j denoting an integer greater than 1. It should be noted that distinct mitigation identifiers may be used for one and the same attack to facilitate the management of the mitigation plans during or after execution thereof.

Thus, in the illustrative example contemplated here, in which the protection service SP1 has implemented a mitigation plan to handle the attack ATTACK, the client device 3 receives this mitigation plan from the server device 4-1 and stores it in the form mplan(SP1,mid=12332) in its non-volatile memory, 12332 denoting the attack ATTACK mitigation identifier.

It should be noted that, in the embodiment described here, the mitigation plans implemented where applicable by the protection services SPk, k=1 . . . N are obtained by the client device 3 following the detection of the attack ATTACK. As a variant, it is possible to contemplate the client device 3 calling upon the protection services SPk, k=1 . . . N in a decorrelated manner with respect to the detection of an attack ATTACK, or following the detection of an anomaly in the computing domain 2 (for example a routing loop between transit domains, loss of incoming/outgoing traffic from the computing domain 2, degradation of services accessible to the domain), etc.

In yet another variant, it is possible to contemplate the client device 3 subscribing with the protection services SPk, k=1 . . . N to a service for notifying the various mitigation actions implemented thereby in order to protect the resources of the computing domain 2, and/or for updating or changing these actions (stopping the action, implementing one or more additional mitigation actions, etc.).

In the illustrative example contemplated here, as mentioned above, it is assumed that the protection service SP2 is incapable of handling the attack ATTACK falling within its scope of action ("SPk/ATTACK NOK" branch). The server device 4-2 of the protection service SP2 notifies the client device 3 of this incapability in step F750 described above by transmitting an error message "5.03 (Service Unavailable)" thereto in response to its mitigation request. In the embodiment described here, the "5.03 (Service Unavailable)" error message advantageously comprises the cause of the error in a "status" parameter introduced into the specification of the DOTS protocol for the purposes of the invention.

In the embodiment described here, it is assumed that a given protection service SPk0 may prove incapable of handling a cyber attack of which it is notified by the client device 3 and of implementing a mitigation plan for mitigating this attack for two reasons:

the attack ATTACK is unknown to the protection service SPk0; in other words, it has no means for identifying the attack traffic and/or does not know how to handle this attack. The protection service SPk0 is therefore not capable of implementing an appropriate mitigation plan in response to the detected attack. This reason is codified in the error message by a "status" parameter for example set to the value "unknown-attack"; or the protection service SPk0 is aware of the attack but is suffering from a lack of resources available to mitigate the attack (capacity problem due to lack of appropriate resources and/or resources of a sufficient quantity to mitigate the attack, for example if said attack is a large attack). This reason is then codified in the error message by a "status" parameter having for example the value "attack-exceeded-capacity".

However, there is no limit attached to the number of reasons or to the reasons why a protection service may prove incapable of handling an attack.

The client device 3 may thereby detect, by way of its determination module 3A, not only the incapability of the protection service SP2 to handle the attack ATTACK, but also determine the cause of this incapability by examining the value of the "status" parameter included in the error message received from the server device 4-2 (step E50).

Sending the mitigation request to the server device 4-2 and receiving the error message in response to this request thus jointly constitute a step of determining the incapability of the protection service SP2 to handle the attack ATTACK by way of the client device 3 within the meaning of the invention.

In one variant embodiment, the client device 3 may detect this incapability other than by using information received directly from the server device 4-2. For example, the client device 3 may detect (directly or indirectly through information received from another entity of the computing domain 2 or by an external entity) that the computing domain 2 is still receiving attack traffic from resources protected by the protection service SP2 even though an explicit mitigation request has been sent by the client device 3 thereto, etc.

If, according to the "status" parameter of the error message, the incapability of the protection service SP2 stems from a lack of knowledge of the attack ATTACK (branch (I) in FIG. 5), and moreover at least one other protection service concerned by the attack has implemented an effective mitigation plan in response to this attack (response "yes" in test step E60), the client device 3 selects one of these mitigation plans in its non-volatile memory 8 (step E70). In the illustrative example contemplated here, the protection service SP1 has implemented such a mitigation plan (mitigation plan mplan(SP1,mid=12332)) and has communicated it to the client device 3 in step F60.

It should be noted that, in the embodiment described here, the client device 3 has called upon the protection services by way of the GET request in order to obtain their mitigation plans as soon as the attack is detected. As a variant, it may send the GET request upon detection of the incapability of the protection service SP1 to implement a mitigation plan (this may make it possible to have a more up-to-date version of the mitigation plan if the attack has evolved for example), or following the detection of the attack and following the detection of the incapability of the protection service SP1, or even periodically, etc. There is no limit attached to the number of times nor to the times at which the client device 3 may call upon the protection services to ascertain the mitigation plans that they are executing.

Next, the client device 3, by way of its development module 3B, based on the selected mitigation plan (mplan (SP1,mid=12332) here), develops a mitigation plan adapted to the resources protected by the protection service incapable of handling the attack, also referred to as "incapable protection service" in the remainder of the description for the sake of simplification (SP2 in the illustrative example under consideration) (step E80).

If the resources of the computing domain 2 that are protected by the incapable protection service are also protected by the protection service (SP1 in the example) that provided the selected mitigation plan, the plan developed by the client device 3 may then consist in identically adopting the selected mitigation plan mplan(SP1,mid=12332), or in adopting only rules and actions corresponding to the resources protected by the incapable protection service SP2 (assuming for example that the protection service SP1 protects other resources in addition to those protected by the incapable protection service SP2).

If the resources of the computing domain 2 that are protected by the incapable protection service SP2 differ at least partially from the resources of the computing domain 2 that are protected by the protection service SP1 that provided the selected mitigation plan, then the client device 3 adapts the mitigation plan provided by the protection service SP1 so that it is applied to the resources protected by the protection service SP2. This adaptation may consist in particular in adapting the rules defining the features of the handled traffic. For example, if the mitigation plan mplan (SP1,mid=12332) contains IP addresses protected only by the protection service SP1 (for example identifying interconnection resources for interconnecting with the network to which the protection service SP1 belongs, while the protection service SP2 protects interconnection resources for interconnecting with another network), the client device 3 replaces these addresses with those protected by the protection service SP2.

Tables 6 and 7 illustrate one example of an adaptation that may be performed by the client device 3 to develop, based on the mitigation plan mplan(SP1,mid=12332), a mitigation plan intended for the protection service SP2.

Table 6 below proposes, by way of illustration, one example of a mitigation plan mplan(SP1,mid=12332) implemented and provided by the protection service SP1.

TABLE 6

```
"mplan": {
    "ace": [
        {
            "matches": {
                "ipv4": {
                    "destination-ipv4-network": "1.2.3.0/24",
                    "source-ipv4-network": "192.0.2.0/24"
                }
            },
            "actions": {
                "forwarding": "drop"
            }
        }
    ]
}
```

Table 7 shows, in bold, the adaptation performed by the client device 3 to develop a mitigation plan adapted to the protection service SP2 (change in the identification of the resources targeted by the attack).

TABLE 7

```
"mplan" {
    "ace": [
        {
            "matches": {
                "ipv4" {
                    "destination-ipv4-network": "11.22.0.0/24",
                    "source-ipv4-network" "192.0.2.0/24"
                }
            },
            "actions": {
                "forwarding": "drop"
            }
        }
    ]
}
```

Other types of modification may be contemplated so as to be consistent with the context of a mitigation, such as for example modifying an IPv4 filter into an IPv6 filter, modifying a filter relating to port numbers and not an address range, creating filters for each of the addresses if the addresses protected by the incapable protection service are not able to be aggregated, replacing certain actions, etc.

In the remainder of the description, g(mplan(SP1)) denotes the plan developed by the client device 3 based on the plan mplan(SP1,mid=12332).

It should be noted that, if multiple protection services have provided the client device 3 with mitigation plans for mitigating the attack ATTACK, the client device 3 may select any one of these plans (randomly, or the first one provided, or even the one corresponding to a particular protection service (for example the most attractive one in terms of cost), etc.), aggregate the various plans received, or as a variant take into account a predetermined selection criterion, such as for example the mitigation plan that requires the least adaptation to be suitable for the incapable protection service.

Once the plan g(mplan(SP1)) has been developed, the client device 3 transmits it, via its transmission module 3C and its communication means 9, to the incapable protection service SP2, and more particularly to the server device 4-2 belonging to the protection service SP2 (step E90). For this purpose, it may send, to the server device 4-2, a "Request Mitigation" DOTS mitigation request as described above, comprising the mitigation plan g(mplan(SP1)).

If, according to the "status" parameter of the error message, the incapability of the protection service SP2 stems from a lack of knowledge of the attack ATTACK (branch (I) in FIG. 5), but the attack falls within the scope of action of the incapable protection service SP2 only (in other words, the resources targeted by the attack ATTACK or involved in routing the attack ATTACK traffic are protected by a single protection service from among the plurality of protection services SP1, . . . , SPN protecting the resources of the computing domain 2, specifically SP2) (response "no" in step E60), then this means that none of the protection services called upon from among the plurality of protection services in step E30 has implemented an effective mitigation plan against the attack ATTACK and a fortiori has not provided such a mitigation plan to the client device 3 in step E40. In other words, the client device 3 does not have, in its non-volatile memory 9, any already "known" mitigation plan against the attack ATTACK.

In the embodiment described here, in this case, the client device 3 sends, to at least one of the protection services SPk, k≠2 protecting resources of the computing domain 2, and more particularly to the server device 4-k of this protection service, a request to emulate the attack ATTACK on the resources protected by this protection service and to obtain a mitigation plan implemented as part of this emulation by the protection service in response to the attack ATTACK (step E100).

For this purpose, it may for example use a "Request Mitigation" DOTS mitigation request as described above, into which the client device 3 inserts an attribute, newly defined for the purposes of the invention (named for example "emulate"), requesting emulation of the attack ATTACK, and the mplan attribute requesting the mitigation plan proposed where applicable by the protection service during the emulation. The purpose of these attributes is to determine whether at least one of the protection services SPk, k=1 . . . N where k≠2 (or more generally k different from the indices of the protection services for which an incapability to handle the attack has been detected by the client device 3) is able to handle the attack. It should be noted that the "emulate" attribute may be used for other purposes, for example for the purpose of simulating a crisis in the computing domain 2, not described in more detail here.

As mentioned above, the attack is emulated on the resources of the computing domain 2 that are protected by the protection service executing the emulation. The mitigation request addressed by the client device 3 to the server device of the protection service should therefore be adapted so as to be compatible with the scope of the protection service to which it is addressed. In other words, the target addresses of the attack that are mentioned in the request should be those of resources protected by the protection service and validated therewith. Such an address validation mechanism is known within the framework of the DOTS protocol and is not described in detail here.

In the illustrative example contemplated here, it is assumed that the client device 3 sends such an emulation request to the protection service SP1. FIG. 7 illustrates the main steps implemented by the protection service SP1 upon receipt of this request, and more particularly here by the emulation module 4D of its server device 4-1.

Upon receipt of the emulation request (step G10), the server device 4-1 triggers the emulation of the attack ATTACK on the resources that it protects (step G20). Such emulation consists in reproducing the attack ATTACK experienced by the computing domain 2 according to the features provided by the client device 3 in the emulation request, and in particular in generating similar attack traffic. The server device may for this purpose use a library of attack traffic collected over time.

During this emulation, if the protection service SP1 is capable of handling the attack thus emulated (response "yes" in test step G30), the server device 4-1 derives appropriate mitigation actions in response to this attack based on this simulation.

It should be noted that the mitigation plan, denoted mplan_emul(SP1) here, proposed during the emulation by the server device 4-1 is not implemented (that is to say activated) thereby: due to the presence of the "emulate" attribute in the request, this is taken into account by the server device 4-1 only for the purposes of simulating the attack on the resources that it protects.

The mitigation plan mplan_emul(SP1) developed where applicable during the emulation is then provided to the client device 3 in response to its emulation request (step G40).

If the protection service SP1 is not capable of handling the attack as emulated by the server device 4-1 (response "no" in test step G30), the server device 4-1 informs the client device 3 thereof by sending, in response to its emulation request, an error message as described above (step G50).

With reference to FIG. 5, the client device 3 examines the one or more responses received to its emulation request (depending on whether one or more protection services have been contacted to emulate the attack) (test step E110), in other words, in the illustrative example contemplated here, the response from the protection service SP1.

If at least one mitigation plan mplan_emul(SP1) resulting from the emulation of the attack has been provided to the client device 3 by a protection service other than the incapable protection service (response "yes" in test step E110), the client device 3 then develops, based on this mitigation plan (or on one of the received mitigation plans selected for example arbitrarily or based on the richness of the information contained in the received mitigation plans), a mitigation plan intended for the incapable protection service, SP2 in the example contemplated. In the example contemplated here, it is assumed that the client device 3 develops a plan g(mplan_emul(SP1)) based on the plan mplan_emul(SP1): for this purpose, it proceeds in a manner identical to what has been described above for step E80. The plan thus developed g(mplan_emul(SP1)) is then transmitted to the server device 4-2 of the protection service SP2 (step E90).

Otherwise (response "no" in test step E110), it contacts another protection service from among the plurality of protection services protecting the resources of the computing domain 2 to emulate the attack if another such protection service exists, and reiterates steps E100 and E110 with this other protection service, which then implements the above-described steps of FIG. 7.

It should be noted that, in the event of failure of the various emulation requests, the client device 3 may reiterate its requests by providing more details about the attack or by sending captures of the attack traffic to the protection services.

With reference to FIG. 6, upon receipt of the mitigation plan developed by the client device 3 (based on the mitigation plan implemented by the protection service SP1 or a mitigation plan emulated thereby), via its reception module 4A and its communication means 15 (step F80), the server device 4-2, by way of its implementation module 4B, then implements, in response to the attack ATTACK, a mitigation plan for mitigating this attack derived from the mitigation plan g(mplan(SP1)) or g(mplan_emul(SP1)) received from the client device 3 (step F90). "Derived" is understood to mean here that the implemented mitigation plan may be identical to the plan received from the client device 3, be developed by the server device 4-2 based on all or some of the information (mitigation rules and actions in particular) contained in the mitigation plan received from the client device 3, or take inspiration from the logic of the received plan. The invention is not limited to execution as such by the server device 4-2 of the mitigation plan received from the client device 3, but also includes an adapted version thereof.

It should be noted that, if the mitigation plan developed by the server device 4-2 based on the plan provided by the client device 3 is not sufficient to stop the attack ATTACK, the client device 3 is informed thereof (either by the server device 4-2 directly, or by another means), and may then develop and communicate, to the server device 4-2, another mitigation plan derived from a mitigation plan provided by another protection service than the protection service SP1.

The branch (I) of FIG. 5 that has just been described refers to a functional incapability of the protection service SP2 to handle the attack ATTACK targeting the resources of the computing domain 2 that it protects, and to the assistance provided by the client device 3 to the protection service SP2 to handle the attack ATTACK in the event of such a functional incapability. As mentioned above, the incapability of the protection service SP2 may, as a variant, stem from a lack of capability, in other words, the protection service SP2 does not have enough resources to mitigate the attack, for example because said attack is a large attack.

In this case (branch II of FIG. 5), the client device 3, upon receipt of the error message transmitted by the server device 4-2, interrogates at least one other protection service from among the protection services SP1, . . . , SPk, . . . , SPN, k≠2 protecting resources of the computing domain 2 to determine whether it is able to provide capacity assistance to the protection service SP2 to mitigate the attack ATTACK (step E120). For this purpose, in the embodiment described here, it sends a DOTS assistance request to at least one of the protection services SP1, . . . , SPk, . . . , SPN, k≠2. In the illustrative example contemplated here, it is assumed that this assistance request is sent to the protection service SP1 and more particularly to its server device 4-1. It should be noted that such a request does not exist in the current version of the DOTS protocol and needs to be defined for the purposes of the invention. Such a request is for example called "Request Assisted Mitigation".

In the embodiment described here, the body of the "Request Assisted Mitigation" assistance request comprises in particular the following attributes:

an attribute, called "type" here, allowing the client device 3 to specify the urgency of the requested assistance, specifically whether the requested assistance should be provided immediately or with a delay; and an attribute, called "required_capacity" here, allowing the client device 3 to specify the minimum capacity resources required to provide assistance to the incapable protection service SP2 (in particular the number and the nature of the resources required).

This list of attributes is in no way exhaustive or limiting per se. Other attributes may be contemplated as a variant or in addition to the abovementioned attributes.

Upon receipt of such an assistance request by the server device 4-1, the latter checks whether the protection service SP1 has the necessary capacity for implementing the required assistance. If this is the case and if the protection service SP1 agrees to provide this assistance, the server device 4-1 responds to the client device 3 with a "2.01 Created" DOTS response message, in which it includes information for implementing the assistance that the protection service SP1 proposes to provide. In particular, in the embodiment described here, an attribute, called for example "Scrubbing_Endpoint(s)", is included in the body of the response message and contains the IP address or addresses (or the one or more domain names) of the one or more entities with which the server device 4-2 is able to establish communication to benefit from the assistance provided by the protection service SP2 to resolve the attack ATTACK. Such an entity is for example a scrubbing center of the protection service SP1 that is responsible for filtering all or some of the suspicious traffic that reaches it.

Other information may be included in the response, such as for example a capacity available at the protection service providing its assistance, one or more security keys intended to be used during this assistance (for example within the framework of a secure communication tunnel established between the incapable protection service and the protection service providing its assistance), a lifespan of the assistance provided by the protection service, etc.

Upon receipt of the information provided by the one or more protection services declaring itself or themselves able to provide assistance to the protection service SP2 incapable of handling the attack, the client device 3 stores said information in its non-volatile memory 9 (step E130). It should be noted that, depending on the lifespan associated, where applicable, with the assistance offered by the protection services, this information is intended to be used to handle the attack ATTACK and lend assistance to the protection service SP2 incapable of handling the attack ATTACK, but also if necessary later on for this same protection service or another one.

It then develops, by way of its development module 3B, a mitigation plan intended for the protection service SP2 using the assistance of one or more protection services that have declared themselves able to provide such assistance (step E140).

In the illustrative example under consideration here, it develops for example a mitigation plan based on the assistance offered by the protection service SP1. More particularly, this mitigation plan comprises the information provided by the protection service SP1 to establish communication between the protection service SP2 and the protection service SP1 in order to allow it to benefit from the assistance of the protection service SP1 to mitigate the attack ATTACK. If multiple protection services have responded favorably to provide assistance to the protection service SP2, the mitigation plan may comprise the information indicated to the client device 3 by all or some of these protection services able to provide their assistance.

In the embodiment described here, the mitigation plan comprising the information allowing the protection service SP2 to benefit from the assistance of one or more other protection services to mitigate the attack is transmitted, by the client device 3, to the server device 4-1 of the protection service SP1 in a "Request Mitigation" DOTS mitigation request comprising in particular, as attributes, the attack mitigation identifier "mid" and an attribute called "assist-on" comprising the information provided by the one or more protection services that have offered their assistance to establish communication therewith (SP1 here) (step E150).

With reference to FIG. 6, upon receipt of this mitigation plan (step F80), the server device 4-2, by way of its implementation module 4B, then implements, in response to the attack ATTACK targeting the resources of the computing domain 2 that it protects, a mitigation plan for mitigating this attack, derived from the mitigation plan received from the client device 3 (step F90). This mitigation plan consists in particular in establishing communication that may be secure (for example a secure tunnel) with the one or more entities of the protection service SP1 identified in the information provided in the mitigation plan ("scrubbing center" of the protection service SP1) and in redirecting, via the communication thus established, all or some of the suspicious traffic (that is to say data suspected of being associated with the attack) to the scrubbing center of the protection service SP1 for handling or filtering. Mechanisms known from the prior art may be used for this purpose to establish such communication, such as for example the IPsec protocol suite.

Suspicious traffic redirected and routed to the protection service SP1 is then handled thereby. Traffic considered to be legitimate may be returned to the protection service SP2 or routed directly to the computing domain 2 by the protection service SP1.

In the embodiment described here, the client device 3 calls upon the protection services SP1, . . . , SPN, which are distinct from the protection service SP2, following the detection of the attack ATTACK and as soon as it has been informed of the incapability of the protection service SP2 to handle said attack. As a variant, in order to anticipate problems linked to a lack of capacity of one of the protection services (for example to be able to absorb the traffic of an attack whose volume exceeds a certain threshold), the client device 3 may preconfigure the assistance able to be provided by the protection services SP1, . . . , SPN. To this end, it may, independently of the detection of a cyber attack against resources of the computing domain 2, send a "Request Assisted Mitigation" assistance request to all or some of the protection services SP1, . . . , SPN (more particularly to their server devices 4-1, . . . , 4-N), in which the "type" attribute is positioned for example at the value "preconfigured". The client device 3 may optionally also include an estimate of the capacity needed for the requested assistance in the request. Such an estimate may be made by way of a heuristic based on the analysis of SNMP (Simple Network Management Protocol) or NETCONF counters, making it possible to estimate the volume of the data packets exchanged on a network. This request may be sent to the protection services simultaneously or sequentially.

Upon receipt of this request by a server device of a concerned protection service, the latter checks whether it has the capacity needed to implement such assistance, as described above. If the assistance request is accepted by the protection service, the server device responds with a "2.01 Created" message, including, in the body of the response, the above-described information for establishing communication with the protection service. A lifespan of the offered assistance may also be included in the response message. The receipt and the storage of this information by the client device 3 in its non-volatile memory 9 finishes the preconfiguration of the assistance.

Thus, in the event of detection of an attack targeting the resources of the computing domain 2, the client device 3 may then, as soon as the "Request Mitigation" mitigation request has been sent to the protection services protecting the resources affected by the attack, request the intervention of these protection services while at the same time inserting, into the request, the preconfigured assistance offer offered by the protection services (in other words the information transmitted thereby for allowing communication to be established therewith for the purposes of providing this assistance), as long as it still has a valid lifespan. Upon receipt of this request, each mitigation service executes a mitigation plan by implementing countermeasures against the attack. If it is not able to handle the suspicious traffic for capacity reasons, it may thus reroute some of the excess traffic to one or more protection services that has or have offered its or their assistance. To this end, it establishes communication with the appropriate entities of these protection services ("scrubbing centers") using the information communicated in the mitigation request. Once this communication has been established, the deficient protection service may redirect excess suspicious traffic that it is not able to manage to a protection service lending assistance thereto. This excess is then managed by the protection service providing the assistance, while legitimate traffic may be returned to the deficient protection service or routed directly to the computing domain 2.

It should be noted that, if a protection service is no longer able to provide its assistance to a deficient protection service or if the client device 3 does not renew the request after the lifespan of its assistance offer has expired, then the client device 3 should no longer include this offer in the mitigation request.

The invention therefore makes it possible in general to provide assistance to a deficient protection service using the other protection services protecting the resources of the computing domain 2, regardless of the reason for this deficiency. A capacity deficiency or a functional deficiency has been mentioned in the illustrative examples provided, but these examples are not limiting per se, and other types of deficiencies may be contemplated.

Moreover, in one particular embodiment, in addition to providing this assistance, it is possible to contemplate the client device 3 also being able, when the attack falls within the scope of action of multiple protection services from among the protection services SP1, . . . , SPN, to check the compatibility of the mitigation plans implemented by each of the protection services concerned by the attack, and to coordinate, where applicable, the consistency of these mitigation plans with one another. For example, at the end of step E30, when the client device 3 has been informed of all of the mitigation plans implemented by the protection services concerned by the attack, it may check whether the obtained mitigation plans are compatible with one another to handle the attack ATTACK.

One example of incompatibility (in other words an anomaly between the mitigation plans) is the creation of a routing loop caused by the association of uncoordinated mitigation plans implemented by multiple protection services. To illustrate such a routing loop, the example of FIG. 1 and of the client domain CL connected to two transit networks TN1 and TN2 via the interconnection links R2 and R1, respectively, will be taken. Upon detection of an attack, it is assumed that the service DPS1 implements a mitigation plan redirecting all legitimate traffic to the interconnection link R1, and that the service DPS2 implements a mitigation plan redirecting all legitimate traffic to the interconnection link R2. In doing so, a routing loop is created: legitimate traffic is no longer able to be routed to the client domain CL. This routing loop is however not able to be detected by the protection services DPS1 and DPS2.

By contrast, in the context of the invention in which the client device 3, at the end of step E40, possesses mitigation plans implemented by the various protection services in response to the attack ATTACK, the client device 3 has the possibility of detecting such a routing loop, or more generally an incompatibility between the implemented mitigation plans. It may be noted that the client domain CL may also detect such an anomaly by observing incoming/outgoing traffic of the computing domain 2 (a routing loop as described above may typically manifest itself through an absence of incoming traffic in the computing domain).

Upon detection of such an incompatibility between the mitigation plans implemented by at least two protection services denoted SPk1 and SPk2, the client device 3, in one particular embodiment, coordinates an adjustment of all or some of the incompatible mitigation plans so as to eliminate the incompatibility. For this purpose, it may proceed for example according to one or the other of the following variant embodiments.

According to a first variant embodiment, the client device 3 selects at least one of the "conflicting" protection services (for example SPk1) and notifies the server device (4-*k*1) thereof of the incompatibility between the mitigation plans (for example the existence of a routing loop). The notified protection service may be selected arbitrarily from among the conflicting protection services, or it is possible to contemplate selecting for example the one that has the least effective mitigation plan. To notify the server device of the selected protection service of the detected incompatibility, the client device 3 may send thereto a DOTS mitigation request with an attribute, newly introduced into the DOTS protocol for the purposes of the invention, called "third-party-dps-conflict" here, aimed at requesting an adjustment, in other words an update, of the mitigation plan proposed by the protection service in question (SPk1 here). This request may furthermore contain elements needed to identify the conflict, such as for example all or some of the mitigation plans having an incompatibility with the one of the protection service in question (typically the conflicting rules and actions).

Upon receipt of this request, the server device 4-*k*1 modifies its mitigation plan to avoid the incompatibility, and transmits its modified plan to the client device 3. The client device 3 checks whether the incompatibility is actually resolved and whether no other incompatibility has been created due to the adjustment of the plan of the protection service SPk1.

According to a second variant, the client device 3 notifies all of the server devices of the protection services involved in the detected incompatibility to ask them to adjust their mitigation plans. In the illustrative example contemplated above, it thus notifies the server devices 4-*k*1 and 4-*k*2. For this purpose, it may use a mitigation request with a "third-party-dps-conflict" attribute as described above.

Upon receipt of this request, each server device adjusts its mitigation plan to resolve the detected incompatibility, and transmits its adjusted mitigation plan to the client device 3. The client device 3 checks the compatibility of the adjusted mitigation plans and, in the event of incompatibility, again proceeds according to the first variant or the second variant.

It should be noted that the client device 3 may regularly contact the server devices 4-*k*, k=1 . . . N to check whether a modification has been made to their mitigation plans, and where applicable check the compatibility of the updates with the existing mitigation plans. As an alternative, each server device may notify the client device 3 of an update of its mitigation plan.

The invention thus offers an effective solution for enhancing the use of a plurality of protection services to protect the resources of a client computing domain. It applies advantageously, but without limitation, when the protection services are managed by distinct administrative entities. This invention advantageously uses the visibility available to the client computing domain to coordinate the actions of the protection services.

Although the present disclosure has been described with reference to one or more examples, workers skilled in the art will recognize that changes may be made in form and detail without departing from the scope of the disclosure and/or the appended claims.

The invention claimed is:

1. An assistance method implemented by a device managing resources of a computing domain, wherein said resources are protected by a plurality of cyber attack protection services, and said device managing the resources of the computing domain has a visibility on actions implemented individually by the plurality of cyber attack protection services to protect the resources of the computing domain against cyber attacks, said method comprising:

detecting an incapability of a first cyber attack protection service from among said plurality of cyber attack protection services, each cyber attack protection service being hosted on a server device, to mitigate a cyber attack targeting at least one resource of the computing domain and falling within a scope of action of the first cyber attack protection service;

developing a mitigation plan for mitigating said cyber attack as a function of a cause of the detected incapability, wherein the developed mitigation plan:

is based on a mitigation plan obtained from, implemented or proposed by a second cyber attack protection service from among said plurality of cyber attack protection services when the incapability is due to a functional deficiency of the first cyber attack protection service; or uses assistance provided by at least said second cyber attack protection service to extend resources of the first cyber attack protection service when the incapability is due to a capacity deficiency of the first cyber attack protection service; and transmitting the developed mitigation plan to the first cyber attack protection service to mitigate said cyber attack and overcome its incapability to mitigate said cyber attack.

2. The method as claimed in claim 1, wherein:

the second cyber attack protection service has implemented a mitigation plan in response to said cyber attack;

said incapability of the first cyber attack protection service stems from a lack of knowledge of said cyber attack by the first cyber attack protection service; and the mitigation plan transmitted to the first cyber attack protection service is developed by adapting said mitigation plan implemented by the second cyber attack protection service to the resources of the computing domain that are protected by the first cyber attack protection service.

3. The method as claimed in claim 1, wherein, when said cyber attack falls within a scope of action of the first cyber attack protection service only and said incapability of the first cyber attack protection service stems from a lack of knowledge of the cyber attack by the first cyber attack protection service, said method furthermore comprises:

sending, to said second cyber attack protection service, a request to emulate said cyber attack on at least one resource of the computing domain protected by the second cyber attack protection service; and obtaining a mitigation plan proposed during the emulation of the cyber attack by the second cyber attack protection service to handle this cyber attack;

the developed mitigation plan being developed based on the mitigation plan obtained in the obtainment step by adapting it to the resources of the computing domain that are protected by the first cyber attack protection service.

4. The method as claimed in claim 1, wherein said incapability of the first cyber attack protection service stems from a lack of resources available at a level of the first cyber attack protection service to mitigate said cyber attack, said method comprising obtaining, from said second cyber attack protection service, at least one item of information for establishing communication between said first cyber attack protection service and the second cyber attack protection service in order to assist it in mitigating said cyber attack, the developed mitigation plan transmitted to the first cyber attack protection service comprising said at least one obtained item of information.

5. The method as claimed in claim 1, comprising:

interrogating all or some of said plurality of cyber attack protection services protecting resources of the computing domain in order to determine said protection services able to provide assistance in mitigating a cyber attack to at least one other cyber attack protection service of said plurality of cyber attack protection services; and storing, for each cyber attack protection service declaring itself able to provide assistance, at least one item of information provided by this cyber attack protection service allowing this assistance to be implemented.

6. The method as claimed in claim 5, wherein said at least one item of information comprises at least one element from among:

a capacity available at a level of said cyber attack protection service suitable for said assistance;

information allowing establishment of communication with said cyber attack protection service able to provide assistance;

at least one security key intended to be used in said assistance with the cyber attack protection service able to provide assistance;

a lifespan of the assistance provided by said cyber attack protection service able to provide assistance.

7. The method as claimed in claim 5, wherein, in the interrogating, the device indicates, to said interrogated cyber attack protection services, a minimum capacity that a cyber attack protection service that declares itself able to provide said assistance must have.

8. The method as claimed in claim 5, wherein said interrogating is implemented following detection of an cyber attack targeting at least one resource of the computing domain.

9. The method as claimed in claim 1, comprising, after detection of said cyber attack, sending, to all or some of the cyber attack protection services of said plurality of cyber attack protection services, a request to obtain a mitigation plan implemented by these cyber attack protection services in response to said cyber attack.

10. The method as claimed in claim 1, comprising, when said cyber attack falls within a scope of action of multiple cyber attack protection services of said plurality of cyber attack protection services:

checking compatibility of the mitigation plans implemented in response to said cyber attack by said multiple cyber attack protection services; and if at least one incompatibility is detected between said mitigation plans in the checking, coordinating an adjustment of all or some of said incompatible mitigation plans so as to eliminate said at least one incompatibility.

11. A method for obtaining, by way of a first cyber attack protection service device of a plurality of cyber attack protection service devices protecting resources of a computing domain, a mitigation plan for mitigating a cyber attack targeting at least one resource of the computing domain, said method comprising, following detection of an incapability of the first cyber attack protection device to mitigate said cyber attack:

receiving a mitigation plan developed by a managing device managing said resources of the computing domain, wherein the mitigation plan:

is based on a mitigation plan obtained from, implemented or proposed by a second cyber attack protection service device of said plurality of cyber attack protection service devices when the incapability is due to a functional deficiency of the first cyber attack protection service device; or uses assistance provided by at least said second cyber attack protection service device to extend resources of the first cyber attack protection service when the incapability is due to a capacity deficiency of said first cyber attack protection service device; and implementing, in response to said cyber attack, an attack mitigation plan derived from the mitigation plan received from the management device to mitigate said cyber attack.

12. The method as claimed in claim 11, wherein the implementing the mitigation plan comprises, when said mitigation plan uses assistance provided by at least said second cyber attack protection service device, routing of data suspected of being associated with said attack to said second cyber attack protection service device in order to process said data.

13. The method as claimed in claim 12, wherein said data are routed to said second cyber attack protection service device in a secure tunnel established with said second cyber attack protection service device by way of at least one item of information contained in said mitigation plan received from the management device.

14. The method of claim 11 further comprising, before receiving the mitigation plan, informing the managing device that the first cyber attack protection service is not able to handle said cyber attack.

15. A first cyber attack protection service device of a plurality of cyber attack protection service devices protecting resources of a computing domain, at least one said resource of the computing domain being targeted by a cyber attack, said first cyber attack protection service device comprising:

a processor; and a non-transitory computer-readable recording medium on which there is recorded a computer program comprising instructions for implementing a mitigation method when executed by the processor, wherein the instructions configure the first protection service device to:

following detection of an incapability of said first cyber attack protection service device to mitigate said cyber attack:

receive a mitigation plan developed by a managing device managing said resources of the computing domain, wherein the mitigation plan:

is based on a mitigation plan obtained from, implemented or proposed by a second cyber attack protection service device of said plurality of cyber attack protection service devices when the incapability is due to a functional deficiency of the first cyber attack protection service; or uses assistance provided by at least said second cyber attack protection service device to extend resources of the first cyber attack protection service when the incapability is due to a capacity deficiency of said first cyber attack protection service; and implement, in response to said cyber attack, a mitigation plan derived from the received mitigation plan to mitigate said cyber attack.

16. A device managing resources of a computing domain comprising:

a processor; and a non-transitory computer-readable recording medium on which there is recorded a computer program comprising instructions for implementing a resource management method when executed by the processor of the device, wherein the instructions configure the device to:

communicate with a plurality of cyber attack protection services for protecting said resources of the computing domain, each cyber attack protection service being hosted on a server device, wherein said device has a visibility on actions implemented individually by the plurality of cyber attack protection services to protect the resources of the computing domain against cyber attacks;

detect an incapability of a first protection service of said plurality of protection services to mitigate a cyber attack targeting at least one resource of the computing domain and falling within a scope of action of the first protection service;

develop a mitigation plan for mitigating said cyber attack as a function of a cause of the detected incapability, wherein the developed mitigation plan:

is based on a mitigation plan obtained from, implemented or proposed by a second cyber attack protection service of said plurality of cyber attack protection services when the incapability is due to a functional deficiency of the first cyber attack protection service; or uses assistance provided by at least said second cyber attack protection service to extend resources of the first cyber attack protection service when the incapability is due to a capacity deficiency of said first cyber attack protection service; and transmit the developed mitigation plan to the first cyber attack protection service to mitigate said cyber attack and overcome its incapability to mitigate said attack.

* * * * *